May 19, 1942.  J. E. BEVINS  2,283,311
COMPENSATING MEANS FOR PRESSURE RESPONSIVE DEVICES
Filed Feb. 16, 1940  2 Sheets-Sheet 1

Inventor.
James E. Bevins.
By Cerstvik & Kalman
Attorneys.

May 19, 1942. J. E. BEVINS 2,283,311
COMPENSATING MEANS FOR PRESSURE RESPONSIVE DEVICES
Filed Feb. 16, 1940 2 Sheets-Sheet 2

Inventor.
James E. Bevins.
By
Cerstvik & Kalman
Attorneys.

Patented May 19, 1942

2,283,311

UNITED STATES PATENT OFFICE 2,283,311

COMPENSATING MEANS FOR PRESSURE RESPONSIVE DEVICES

James E. Bevins, Wood-Ridge, N. J., assignor to Bendix Aviation Corporation, South Bend, Ind., a corporation of Delaware Application February 16, 1940, Serial No. 319,367

3 Claims. (Cl. 73—179)

The present invention relates to pressure responsive devices or indicating instruments, and more particularly to altitude and/or temperature compensating means for such devices or indicating instruments.

The invention is particularly adaptable to pressure responsive devices or indicating instruments of the type wherein a differential between the pressures acting on opposite sides of a yielding wall of a pressure responsive element such, for example, as a diaphragm, established by a change in one of said pressures, is utilized to operate an indicator or other means in accordance with the rate of change of pressure, and wherein means are provided for the equalization of the two pressures when said change no longer takes place.

An example of an instrument of the type described above is a rate of climb indicator for aircraft, and the invention is illustrated and described in connection with such an instrument, but it will be understood that it is not restricted to this particular use.

One of the objects of the invention is to provide an improved pressure responsive device or rate of climb indicator embodying a novel pressure equalizing device of the type disclosed in the patent to Gregory V. Rylsky, No. 2,147,108, dated February 14, 1939, in which equalization of pressure is obtained by molecular diffusion, and constituting an improvement over the pressure equalizing device and rate of climb indicator disclosed in Patent No. 2,147,962, dated February 21, 1939.

Another object of the invention is to provide a novel combination of elements constituting means for compensating a rate of climb indicator for changes in temperature.

A further object is to provide a novel rate of climb indicator comprising a pressure responsive element having a yielding wall subject to a changing atmospheric pressure on one side thereof, flow retarding means for retarding the rate at which pressure on the other side of said yielding wall tends to become equal to said changing atmospheric pressure, and a novel valve structure in which the parts of the valve per se are responsive to changes in temperature to cause operation of said valve for controlling and regulating the air flow through said flow retarding means in accordance with changes in temperature, whereby said climb indicator is compensated for changes in air density due to changes in temperature.

Still another object of the invention is to provide, in an instrument of the class described, a novel flow retarding assembly comprising a flow retarding element, and a temperature responsive valve for regulating the air flow through said flow retarding element in accordance with temperature changes.

A further object is to provide a novel flow retarding assembly for an instrument of the class described, comprising a flow-retarding diffuser element, and a temperature responsive valve for regulating the flow through said diffuser element in accordance with temperature changes.

A still further object of the invention is to provide a novel flow retarding assembly for an instrument of the class described, requiring no altitude compensation and comprising a diffuser element of porous material of such porosity that the flow of air therethrough is not affected by the difference in air density at different altitudes, and a temperature responsive valve for regulating the air flow through said diffuser assembly in accordance with temperature changes to compensate for changes in air density due to temperature changes.

Another and important object of the invention is to provide a novel valve structure having its operating parts of dissimilar metals, whereby said valve is automatically operated in response to changes in temperature.

Yet another object is to provide a novel temperature responsive valve comprising a valve body of one kind of metal and providing a valve opening, and a closure member of another kind of metal and located in said valve body for closing said opening, whereby changes in temperature cause relative movement between said valve body and said closure member due to different rates of expansion thereof to control said valve opening, and whereby no biasing spring is required for the closure member of said valve.

Other objects and advantages of the invention will appear more fully hereinafter from a consideration of the detailed description which follows, taken together with the accompanying two sheets of drawings wherein one embodiment of the invention is illustrated by way of example. It is to be expressly understood, however, that the drawings are for purposes of illustration and description only, and are not to be construed as defining the limits of the invention, reference being primarily had for this purpose to the appended claims.

In the drawings, wherein like reference numerals designate like parts in the several views.

Figure 1:
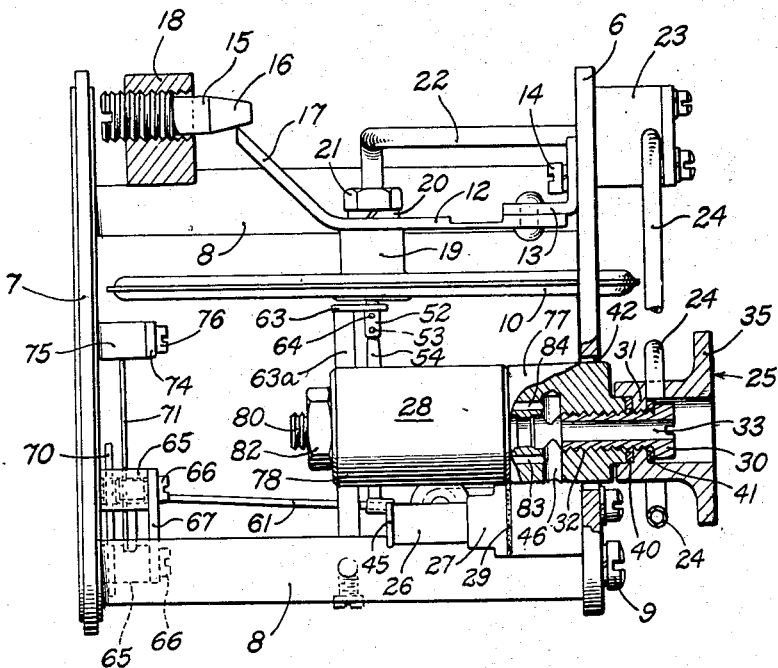
Fig. 1 is a side elevation, partly in section, of one embodiment of the invention shown applied to the operating mechanism of a rate of climb indicator for aircraft.

The invention consists substantially in the construction, combination, location and relative arrangement of parts for obtaining the results desired in accordance with the foregoing objects, as will be more fully hereinafter set forth in the specification, as shown in the drawings by way of example, and as finally pointed out in the claims.

Figure 2:
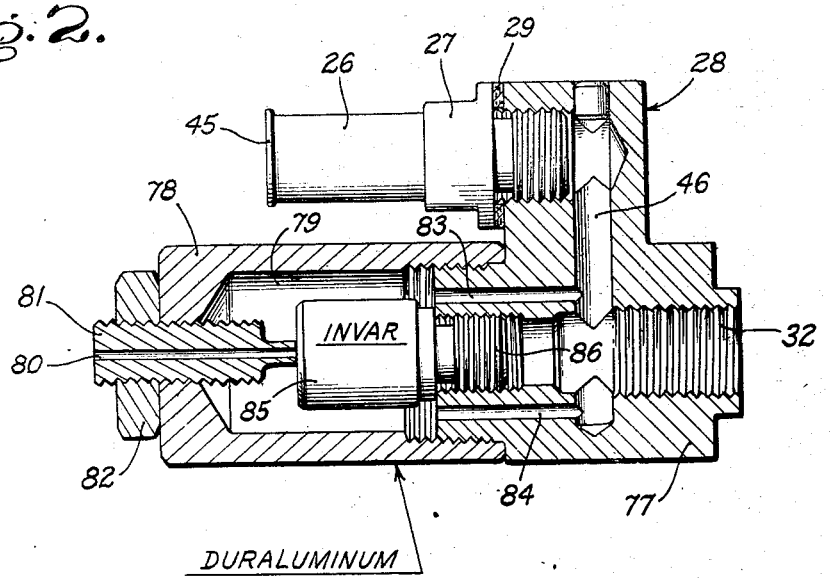
Fig. 2 is an enlarged detail sectional view of the novel flow regulating temperature responsive valve structure embodying the invention, showing its functional relationship to the flow-retarding element.
Figure 3:
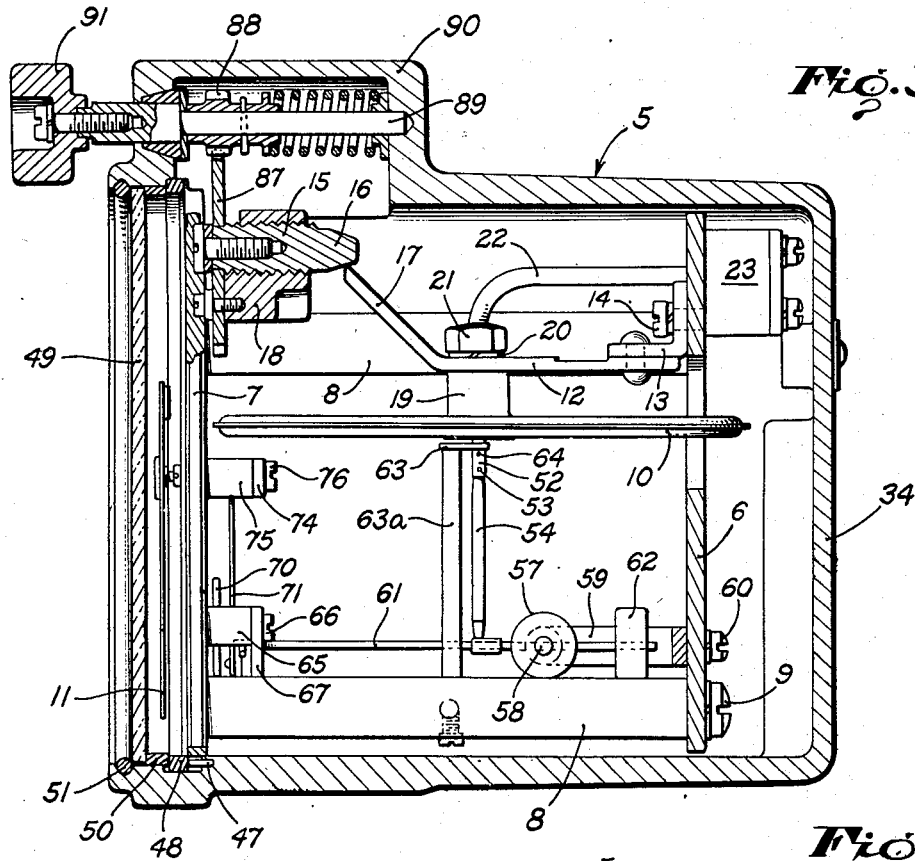
Fig. 3 is a sectional elevation of a complete rate of climb indicator embodying the invention.
Figure 4:
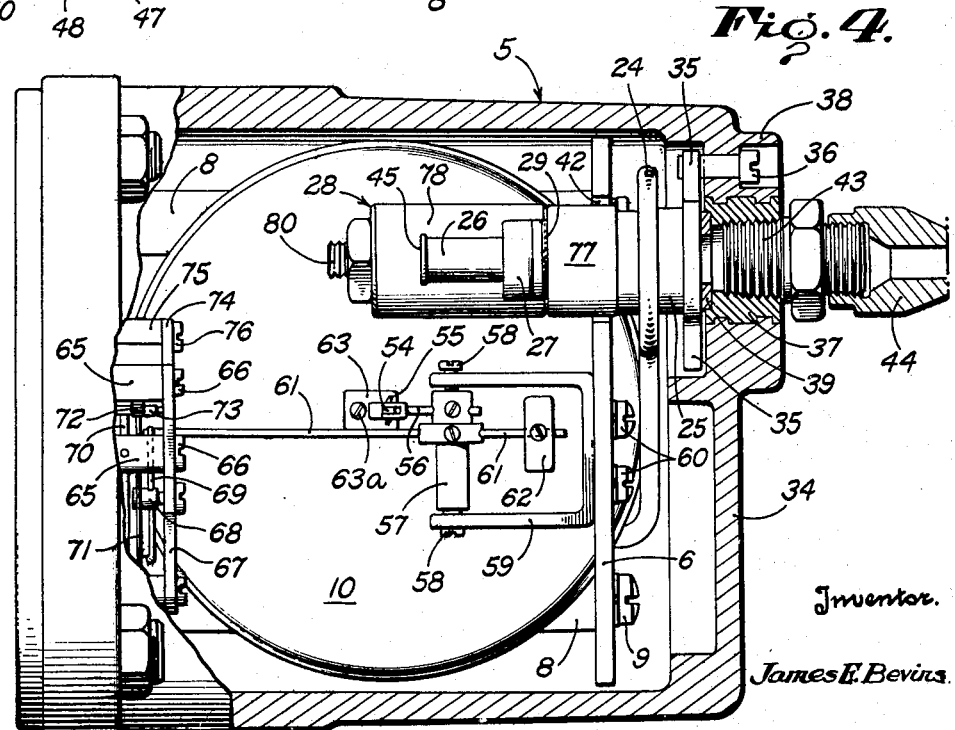
Fig. 4 is a partly sectional view of the instrument of Fig. 3, the section being taken at a different angle to show parts not visible in Fig. 3.

Referring now to the drawings, the device embodying the invention, which, in the illustrated embodiment is shown as a rate of climb indicator for aircraft, comprises an operating mechanism mounted, as shown in Figs. 3 and 4, within an instrument casing 5 of any suitable material such as "Bakelite," on a frame formed, for example, by a rear frame member or plate 6 and a front face plate 7, as shown in Figs. 1 and 2. The plates 6 and 7 are held in spaced relation in any suitable manner as, for example, by spacing rods 8 and screws 9.

Mounted in the frame thus constituted is a pressure responsive element such as an expansible diaphragm 10 of any suitable type that is adapted to expand and contract to actuate an indicator or pointer 11 through suitable motion transmitting means when a pressure differential is established between the pressure inside of said diaphragm 10 and the pressure surrounding said diaphragm within the casing 5.

The pressure differential may be established by providing a free passage between the inside of the case 5 and the atmosphere outside of said case, and providing a restricted passage between the inside of the diaphragm and the atmosphere outside of the case; or, as in the illustrated embodiment, by providing a free passage between the inside of the diaphragm 10 and the atmosphere outside of the case 5, and providing a restricted passage, through suitable flow-retarding means, between the inside of said case and the atmosphere outside thereof in a manner to be described more fully hereinafter.

In the present embodiment, the diaphragm 10 is mounted in a suitable manner on a flexible arm 12 that is carried by a bracket 13 secured to the rear plate member 6 by means of screws 14. Suitable means are provided for obtaining zero adjustment of the instrument and, as shown in Fig. 1, comprise a set screw 15 having a tapered or coned end 16 which engages the end 17 of the flexible arm 12, said end 17 being bent upwardly at an angle to said arm 12. The set screw 15 is threaded in a bracket 18 formed as part of one of the spacing rods 8.

The pressure responsive diaphragm 10 may be attached to said flexible arm 12 by means of a central boss 19 that extends through said arm 12 to receive a locker washer 20 and nut 21 to securely hold said diaphragm on said arm. The boss 19 is hollow and connects the inside of the diaphragm 10 to the atmosphere outside of the case 5 by means of the tube or conduit 22 and through a coupling chamber 23 from which extends another tube or conduit 24 to another coupling member 25 that is vented to the atmosphere outside of the casing through the rear wall of the latter as hereinafter described.

The novel means embodying the invention are now provided for establishing a differential between the pressure inside of the diaphragm 10 and the pressure outside of said diaphragm, i. e. the pressure within the case 5. In the present embodiment said means comprise a flow-retarding element providing restricted communication between the inside and outside of the case for retarding the rate at which the pressure within the case 5, i. e. the pressure on the outside of the diaphragm 10, tends to become equal to a changing atmospheric pressure inside of said diaphragm when the inside of said diaphragm is subjected to a changing atmospheric pressure as, for example, when the instrument is carried on an aircraft that is climbing or diving.

The flow-retarding means comprise, as shown in detail in Fig. 2 of the drawings, a diffuser element 26 of the type shown in the hereinbefore-mentioned Patent No. 2,147,962 and carried by a threaded coupling member 27 screwed into a temperature-controlled valve assembly 28 the purpose of which will appear more fully hereinafter. To insure an air-tight fit between the coupling member 27 and the valve assembly 28 a gasket 29 is provided therebetween.

The temperature-controlled valve assembly is located within the casing 5 as shown in Figs. 1 and 4 but is placed in communication with the atmosphere outside of said casing and, for this purpose, is connected to the coupling member 25 by means of a screw 30 which engages the internal screw threads 31 and 32 of the coupling member 25 and valve assembly 28, respectively, and which has a central longitudinal bore 33 therethrough to provide a passage to the interior of said valve assembly from the outside of the casing 5 through the coupling member 25.

The coupling member 25 is arranged to be attached to the rear wall 34 of the casing and to provide a further connection to the outside of said casing and for this purpose is provided with ears or lugs 35 engaged by bolts 36 extending through the casing. An internally threaded bushing 37 is molded in a boss 38 provided in the rear wall 34 of the casing, and a gasket 39 is provided between said bushing 37 and the coupling member 25 to maintain an air-tight seal therebetween (Fig. 4). Also to provide an air-tight seal between the valve assembly 28 and the coupling member 25, one gasket 40 is interposed between said assembly and said coupling member and another gasket 41 is interposed between the head of the screw 30 and said coupling member 25 (Fig. 1). The valve assembly 28 and the diffuser element 26 project into the casing through an opening 42 provided in the rear plate member 6 of the mechanism frame.

If desired, a nipple 43 may be threaded into the bushing 37 (Fig. 4) and may be connected to a pipe coupling 44 for connecting the inside of the case 5 and the inside of the diaphragm 10 to a source of static pressure such as the static side of a Pitot tube (not shown) located on an exterior part of the aircraft on which the instrument is carried.

The diffuser element 26 may be a tube of thin porous porcelain, although other suitable materials such as carbon, paper, etc., can be used as disclosed in the aforesaid patent to Rylsky No.

2,147,108. The diffuser element is closed at one end by a cap 45 and has its other end in communication with a passage 46 of the valve assembly 28 through the coupling member 27.

Thus, by virtue of the flow-retarding properties of the diffuser element 26, the inside of the case 5 and, hence, the outside of the diaphragm 10, is in restricted communication with the atmosphere outside of said case, through said diffuser element and through passage 46, bore 33, coupling 25, nipple 43 and pipe coupling 44. On the other hand, the inside of diaphragm 10 is in free communication with the atmosphere outside of the case 5 through hollow boss 19, tube 22, coupling 23, tube 24, coupling 25, nipple 43 and pipe coupling 44.

The front of the case 5 is likewise made airtight, and for this purpose there is provided a shoulder 47 on the casing, against which abuts the rear face of the mechanism plate 7, the mechanism being inserted through the open front end of the case before sealing the latter. The mechanism is held securely in place against the shoulder 47 by means of a split snap ring 48 which abuts the front peripheral face of the face plate 7. The case is finally sealed by a cover glass 49 urged against a sealing gasket 50 by means of a split snap ring 51.

From the foregoing it will be seen that the inside of the case 5 is air-tightly sealed and the only communication therefrom to the outside thereof is through the diffuser element 26 and valve assembly 28, while the inside of the diaphragm 10 is in free communication with the atmosphere outside of the case. As a result, when an aircraft carrying the instrument climbs to a higher altitude, the atmospheric pressure decreases, and consequently the pressure inside of the diaphragm 10 decreases immediately and correspondingly because of the free passage to the atmosphere. The pressure inside the case 5, however, cannot immediately equalize with the decreased atmospheric pressure outside the case because of the restriction provided by the diffuser element 26 and valve assembly 28 and, therefore, the pressure inside the case 5 is greater than inside the diaphragm, thereby causing the diaphragm to contract until the aircraft stops climbing, whereupon the pressure inside the case equalizes with the outside atmospheric pressure and the diaphragm is restored to normal.

If the aircraft descends to a lower altitude, the atmospheric pressure increases, thereby immediately increasing the pressure inside the diaphragm, while the pressure outside of the diaphragm, i. e. inside the case 5 cannot immediately equalize with the decreased pressure because of the restricted passage and, therefore, the diaphragm expands until the aircraft stops descending when the pressures will equalize.

The expansion and contraction of the diaphragm is proportional to the rate of change of atmospheric pressure and, therefore, to the rate of flow of air between the inside and outside of the casing 5 through diffuser element 26 and valve assembly 28.

Motion transmitting means are now provided between the diaphragm 10 and the indicator or pointer 11 for actuating the latter in accordance with the expansion and contraction of the former, whereby said pointer will indicate the rate of climb or descent on a dial attached to the face plate 7. In the form shown in the drawings said motion transmitting means comprise a post 52 extending centrally from the diaphragm 10 on the side opposite the boss 19, said post being pivotally connected at 53 to one end of a link 54. The other end of link 54 is pivotally connected at 55 (Fig. 4) to a rocker arm 56 on a rocking shaft 57 which is journaled in suitable bearings 58 carried by a bracket 59 secured to the rear plate member 6 in any suitable manner as by screws 60.

Also carried by the rocking shaft 57 is a rocking arm 61 having a counterweight 62 at one end thereof and being adapted to be swung about the axis of said rocking shaft 57 upon expansion and contraction of the diaphragm, by virtue of the connecting elements 52, 54 and 56. For limiting the movement of diaphragm 10, the post 52 is embraced by a forked element 63 which stops the diaphragm when the latter expands, and which is engaged by a pin 64 on the post 52 when the diaphragm contracts. The position of the fork 63 is made adjustable by mounting it on a rod 63a adjustably carried by one of the spacers 8.

Mounted on the face plate member 7 by means of spacers 65 and screws 66 is a plate 67 in which is rotatably mounted a spindle 68. An arm or finger 69 extends from said spindle 68 transversely thereof and is engaged by the end of the rocking arm 61 for rotation thereby in one direction against a hairspring 70 when the diaphragm expands, and said hairspring 70 rotates said spindle in the opposite direction when the rocking arm 61 moves away from finger 69 as during contraction of said diaphragm.

A counterweighted gear sector 71 carried by the spindle 68 meshes with a pinion 72 on a second spindle 73 rotatably mounted in a plate 74 which is held in spaced relation from face plate 7 by suitable spacers 75 and screws 76. The spindle 73 projects through a small opening in the face plate 7 and carries at its outer end the indicator or pointer 11 which cooperates with a suitable scale (not shown) that is usually attached to the face plate or may be inscribed thereon.

Errors in the instrument due to changes in density of the air at various altitudes are automatically compensated for by the porous diffuser element since its construction, material and crystalline structure are selected in accordance with the teachings of the aforesaid Rylsky patent No. 2,147,108.

In order to compensate the instrument for errors due to changes in air density caused by changes in temperature, however, novel means are provided which constitute an improvement over the compensating means shown in Bevins Patent No. 2,147,962.

It is well known that air is less dense at high temperatures and more dense at low temperatures, and it is also known that at a given pressure, air flows faster at low temperatures than at high temperatures. Consequently, when the instrument described herein is at low temperatures, the air flows faster through the flow-retarding element 26, thereby causing quicker equalization of the pressures inside and outside of the diaphragm 10 and thus producing a lower indication of rate of climb or descent than is actually taking place. On the other hand, when the instrument is at higher temperatures, the air flows more slowly through the flow retarding element 26, thereby causing slower equalization of the pressure differential and thus producing a higher indication of rate of climb or descent than is actually taking place.

In accordance with the present invention the novel temperature compensating means are so arranged that at high temperatures, when the air flows slowly, some of the air which would flow through the flow retarding element is by-passed through an unrestricted passage, thereby causing quicker equalization of the pressure differential on the diaphragm 10 and at a rate proportional to the changes in density and changes in temperature, and thus preventing a higher reading so that the rate of climb or descent indicated by the pointer 11 is the true rate. On the other hand, at low temperatures, the by-pass is gradually reduced and finally closed in accordance with the rate of decrease of the temperature, thereby causing more and finally all of the air to flow through the flow-retarding element to produce slower equalization of the pressure differential on the diaphragm 10, and thus preventing a lower reading so that the pointer 11 will indicate the true rate of climb or descent.

In the form shown in detail in Fig. 2 of the drawings, said temperature compensating means comprise a springless bi-metallic temperature responsive valve included in the valve assembly 28 which, in accordance with the invention, is made up of two metal castings 77 and 78, the former having the flow-retarding element 26 attached thereto by the coupling member 27 and containing the passage 46 and threaded passage 32. The casting 78 is hollow, as shown, and is screwed to the casting 77 for ease of assembly and forms a valve chamber 79 having valve opening constituted by a bore 80 in an externally threaded member 81 screwed into the casting 78 and locked by a nut 82.

The chamber 79 communicates with the passages 46 and 32 by means of a pair of passages 83 and 84 so that air from the casing 5 may flow in freely and without restriction through the valve opening 80 into the valve chamber 79 and out to the atmosphere outside the case 5 through passages 83, 84 and 32, or vice versa.

In order to regulate the flow through valve opening 80 as temperature decreases and increases or to completely stop the flow therethrough at a predetermined low temperature a valve closure member is provided which is in the form of a relatively short cylinder 85 having a reduced externally threaded portion 86 by which it is screwed into and held rigidly in the metal casting 77, the end of the cylinder 85 being adjacent the inner end of the member 81 so as to completely close the opening 80 at a predetermined temperature.

Relative movement between the valve opening 80 and the valve closure member 85 is obtained in accordance with changes in temperature by making the casing 78 of one kind of metal as, for example, Duralumin, and making the valve closure member 85 of another kind of metal such as Invar, for example, thus providing a springless bi-metallic valve which is per se responsive to changes in temperature. Since the expansion and contraction of Duralumin is much greater than of Invar, it will be seen that at low temperatures the member 81 and its opening 80 will move toward the closure member 85, and at high temperatures member 81 will move away from said closure member.

The initial relative position of valve closure member 85 with respect to valve opening 80 may be adjusted manually by loosening the nut 82 and turning the threaded member 81 to move it toward or away from the closure member 85. Generally, this adjustment is made so that the valve opening 80 is completely open at about 25° C. and becomes completely closed at substantially −30° C. Thus, the flow of air through the valve opening is regulated in accordance with changes in temperature to compensate for errors due to changes in density, which are accompanied by such temperature changes.

If desired, for convenience in making the zero adjustment of the pointer 11 by means of the set screw 15, the latter may be arranged for actuation from outside of the case 5 by suitable means such as shown in Fig. 3 of the drawings, wherein the set screw 15 carries a gear 87 meshing with a pinion 88 secured to or formed integrally with an operating shaft 89 journaled in auxiliary compartment 90 of the casing 5 with one end of said shaft extending out of the case, said outer end being provided with a knurled knob 91 for manually rotating the shaft. By turning the knob 91, the diaphragm 10 may be moved bodily up or down by the spring arm 12 as viewed in Fig. 3, thereby adjusting the pointer to zero through the motion transmitting mechanism.

There is thus provided a novel construction of a rate of climb device embodying novel temperature compensating means in the form of a springless bi-metallic valve which is per se temperature responsive, requiring no bi-metal strips or spring-biased movable valve parts, and which may be capable of use for other purposes than for use in a rate of climb device.

While only one embodiment of the invention has been illustrated and described by way of example, it is to be understood that the invention is not limited thereto and is capable of a variety of physical embodiments which will now appear to those skilled in the art to which the invention appertains, and that changes may be made in the form, details of construction, and arrangement of the parts and in the materials used, without departing from the spirit or scope of the invention. Reference is, therefore, to be had to the appended claims for a definition of the limits of the invention.

What is claimed is:

1. In a rate of climb indicator, a substantially air-tight case, a pressure responsive expansible and contractible diaphragm within said case and having the inside thereof in free communication with the atmosphere outside of said case, indicating means including a pointer, motion transmitting means connecting said pointer to said diaphragm for actuation thereby, manually operable means for bodily shifting the diaphragm along its operating axis to adjust said pointer to zero, and a flow retarding assembly mounted in said case for controlling the retardation of the flow of air between the inside and outside of said case when the atmosphere pressure changes, said assembly consisting of a valve body providing a valve chamber having a valve opening leading into the inside of said case for direct but controllable passage of air between the inside of the case and the atmosphere outside of said case, a valve closure member rigidly mounted in said valve chamber for cooperation with said valve opening, a single porous diffuser element mounted on said valve body in parallel air flow relation with said valve opening and providing flow-restricting passage between the inside and outside of said case, said valve body being of duralumin and said closure member being of invar, whereby said valve body expands and contracts to a greater extent than said closure member in response to changes in temperature, to produce relative movement therebetween for regulating the flow of air through said valve opening for direct communication with the atmosphere outside of the case and causing more air to flow through said diffuser element at low temperatures than at high temperatures to compensate for errors due to the difference in viscosity of the air at different temperatures, and means for initially adjusting the relative distance between said valve opening and said valve closure member for calibration purposes.

2. In a rate of climb indicator, a substantially air-tight case, a pressure responsive expansible diaphragm within said case having the inside thereof in free communication with the atmosphere outside of said case, indicating means including a pointer, motion transmission means connecting said pointer to said diaphragm for actuation thereby, and a flow retarding assembly mounted in said case for controlling the passage of air between the inside of said case and the outside thereof, said assembly consisting of a valve body providing a valve chamber having a valve opening for direct but controllable passage of air between the inside of said case and the atmosphere outside thereof, a valve closure member rigidly mounted in said valve chamber for cooperation with said valve opening, and a single diffuser element mounted on said valve body in by-pass relation with said valve opening and providing a restricted passage between the inside and outside of said case, said valve body and said closure member being of different materials having different temperature coefficients of expansion and contraction, whereby relative movement of said valve closure member takes place in response to changes in temperature to regulate the flow of air through said valve opening for direct communication with the atmosphere outside of the case, thereby regulating the amount of air flowing through said diffuser element in accordance with said changes in temperature to compensate for errors due to changes in viscosity of the air caused by said temperature changes.

3. In a rate of climb indicator, a substantially air-tight case, a pressure responsive element within said case in communication with the atmosphere outside of said case, indicating means, motion transmission means connecting said indicating means to said pressure responsive element for actuation thereby, and a flow retarding assembly mounted in said case for controlling the passage of air between the inside of said case and the atmosphere outside thereof and consisting of a single flow retarding element providing restricted communication between the inside and outside of said case, and a springless bi-metallic valve responsive to changes in temperature in by-pass relation to said retarding element for defining direct communication between the interior of said case and the atmosphere exterior thereof and for regulating the amount of air flowing into and out of said case through said retarding element.

JAMES E. BEVINS.